United States Patent [19]

Crean et al.

[11] 4,188,047
[45] Feb. 12, 1980

[54] TRAILER SUSPENSION

[75] Inventors: John C. Crean, San Juan Capistrano; Bill Stroppe, Long Beach, both of Calif.

[73] Assignee: Fleetwood Enterprises, Inc., Riverside, Calif.

[21] Appl. No.: 910,464

[22] Filed: May 30, 1978

[51] Int. Cl.² .............................................. B62D 21/00
[52] U.S. Cl. .................................. 280/678; 267/63 R
[58] Field of Search ................. 280/677, 678; 267/63, 267/67

[56] References Cited

U.S. PATENT DOCUMENTS

| 1,835,013 | 12/1931 | Chryst | 267/9 R |
|---|---|---|---|
| 2,213,690 | 9/1940 | Caldwell | 267/67 |
| 2,231,285 | 2/1941 | Austin | 267/11 |
| 2,485,434 | 10/1949 | Cynamon | 180/88 |
| 3,147,964 | 9/1964 | Wolf | 267/63 |
| 3,545,737 | 12/1970 | Lamprey | 267/141 |
| 3,774,934 | 11/1973 | McGee | 280/678 |
| 3,940,553 | 2/1976 | Hawkins | 174/42 |

*Primary Examiner*—Philip Goodman
*Attorney, Agent, or Firm*—Edward D. O'Brian

[57] ABSTRACT

The manner in which a trailer "rides" and the "towability" of a trailer can both be improved by utilizing a wheel suspension system employing a separate suspension structure for each wheel of the trailer. Each of such suspension structures includes an elongated member serving as an axle. One of the ends of such a member is connected to the chassis of the trailer using a torsional energy absorption device while the other of the ends of the member carries a wheel of the trailer. The latter end of the member is connected to the chassis of the trailer through the use of a spring. Various adjustments are embodied within the suspension structure for use as reasonably required in connection with the trailer.

10 Claims, 5 Drawing Figures

U.S. Patent  Feb. 12, 1980  4,188,047
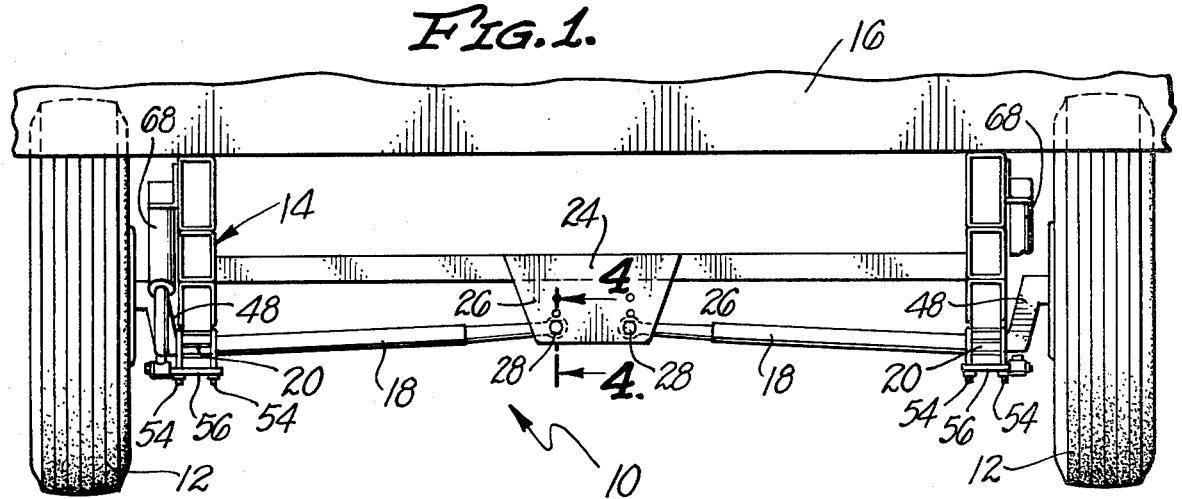
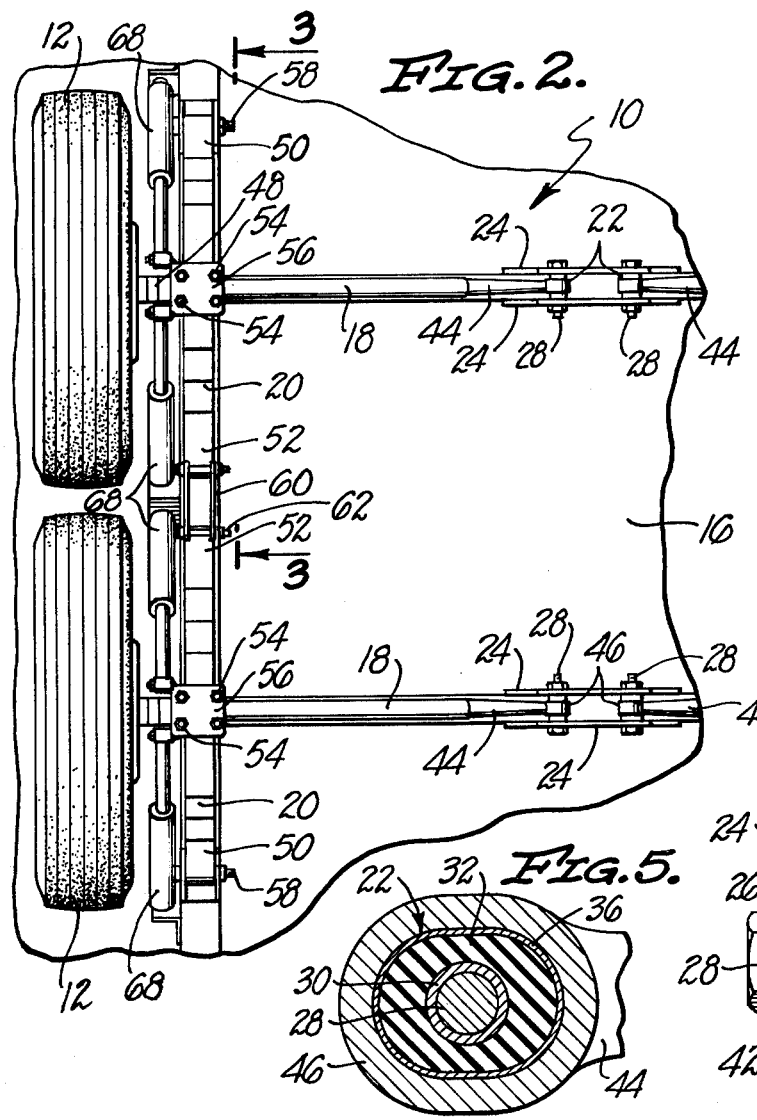
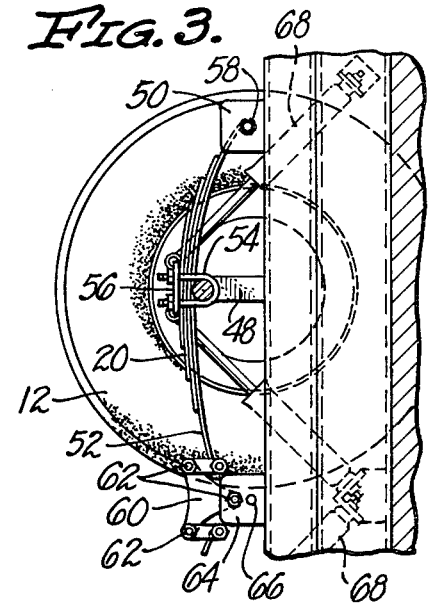
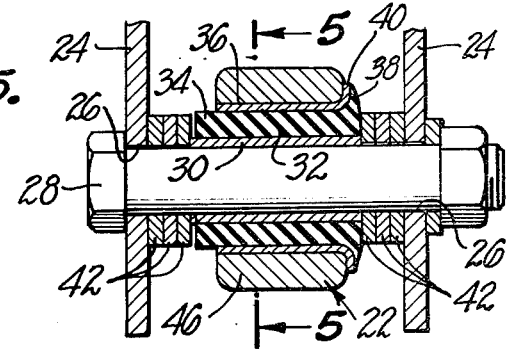

TRAILER SUSPENSION

BACKGROUND OF THE INVENTION

The invention set forth in this specification pertains to a new and improved trailer suspension system.

The expression "suspension system" is commonly employed to designate the complete structure used in connection with a vehicle such as a trailer to connect the wheels of such a vehicle to a lower frame or portion of such a vehicle. Such a lower frame or portion of the body of a vehicle is commonly referred to as the "chassis" of the vehicle. Such suspension systems are used so as to avoid the direct connection of the wheels of a vehicle to the body of a vehicle as, for example, by mounting an axle holding the wheels directly onto the body of a vehicle. Such suspension systems are desired in vehicles because they tend to minimize the forces applied to the body of a vehicle as the vehicle is moved along a surface such as a road.

It is considered that the inherent differences between different types of vehicles effectively require the use of various different, specialized suspension systems with various different types of vehicles. For example, a trailer is inherently different from an automotive vehicle in that a trailer is adapted to be towed behind such a vehicle whereas such an automotive vehicle is intended to be self-propelled and steered through the use of appropriate conventional mechanisms. In the past various different suspension systems have, of course, been employed with various different trailers. Although such prior trailer suspension systems have been of a utilitarian character it is considered that they have not been completely desirable for any one of several different reasons and it is considered that the more desirable of such prior trailer suspension systems have been undesirably expensive.

An understanding of the present invention is not considered to require a detailed discussion of various prior trailer suspension systems as indicated in the preceding. In general, however, it is believed that most common prior trailer suspension systems have tended to transmit various forces such as are caused by the wheels of a trailer engaging pavement or road imperfections to the chassis of such trailers to an undesirable extent. The transmission of such "road shocks" to the body of a trailer is undesirable; the forces associated with such road shocks tend to cause damage to the body of a trailer. It is also considered that prior trailer suspension systems have tended to respond to various forces as noted and other forces such as winds acting against a trailer so as to detract from the movement of the trailer in other than a straight line behind a pulling vehicle.

SUMMARY OF THE INVENTION

It is believed that it will be apparent from the preceding that there exists a need for new and improved trailer suspension systems. A broad objective of the present invention is to fulfill this need. More specifically the invention is intended to provide trailer suspension systems which improve the manner in which a trailer "rides" and which improves the towing characteristics or "towability" of a trailer. Further objectives of the present invention are to provide trailer suspension systems as noted which are comparatively inexpensive, which are capable of being assembled by comparatively unskilled labor in a comparatively short time period, and which incorporate various adjustments as may be reasonably need to facilitate the suspension system operating properly. Such adjustments may be required either as the result of manufacturing tolerances or as a result of variations in the load carried by a trailer.

In accordance with this invention these various objectives are achieved by providing in a trailer having a chassis, a plurality of wheels and suspension means for connecting the wheels to the chassis the improvement which comprises: the suspension means comprising a separate suspension structure for each of the wheels, each of the suspension structures including an elongated member serving as an axle, a spring, a torsional energy absorption means for use in absorbing torsional energy and a mounting means for use in securing the torsional energy absorption means to the chassis, the member having a chassis mounting end and a wheel mounting end, one of the wheels being rotatably mounted on the wheel mounting end, the spring being connected to the wheel mounting end and to the chassis and serving to resiliently support the wheel mounting end on the chassis, the mounting means being located on the chassis remote from the wheel and the wheel mounting end, the torsional energy absorption means being connected to the chassis mounting end and to the mounting means so as to absorb torsional energy transmitted through the elongated member.

BRIEF DESCRIPTION OF THE DRAWING

Because of the nature of the invention it is considered that it is best more fully described with reference to the accompanying drawing in which:

FIG. 1 is a front elevational view of a presently preferred embodiment or form of a trailer suspension system in accordance with this invention;

FIG. 2 is a bottom plan view of a part of the trailer suspension system illustrated in FIG. 1;

FIG. 3 is a partial cross-sectional view taken at line 3—3 of FIG. 1;

FIG. 4 is a partial cross-sectional view at an enlarged scale taken at line 4—4 of FIG. 1; and FIG. 5 is a partial cross-sectional view taken at line 5—5 of FIG. 4.

The trailer suspension system illustrated in the drawing and described in detail in the remainder of this specification utilizes operative concepts or principles as are verbally set forth and defined in the appended claims. Those skilled in the field of vehicle suspension will realize that these concepts or principles can be embodied within suspension systems which differ from the precise suspension system illustrated as to various details of an essentially routine engineering character.

DETAILED DESCRIPTION

The trailer suspension system 10 illustrated in the drawing in effect is composed of four different suspension structures (not separately numbered) which are utilized for the purpose of mounting conventional automotive type wheels 12 upon a lower frame or chassis 14 of a trailer 16. Each of the suspension structures (not separately numbered) employed utilizes an elongated rod-like member 18 serving as an axle, an elongated automotive type leaf spring 20, a torsional energy absorption device 22 and two plates 24 attached to the chassis 14 so as to extend downwardly from the chassis 14. Because of the manner in which these plates 24 are utilized they may be referred to as a mounting means or mounting bracket (not separately numbered).

A plurality of holes 26 are located in the plates 24 so that there are pairs of these holes 26 in the plates 24 which are aligned with one another and so that various different pairs of these holes 26 are located vertically adjacent to one another. These holes 26 are arranged so that a common bolt 28 may be mounted at various different vertically spaced positions relative to the chassis 14 in order to provide for camber adjustment of the wheels 14. Each bolt 28 is intended to secure a torsional energy absorption device 22 in place between two of the plates 24 so that such a device 22 is held immobile relative to the plates 24 as the complete system 10 is operated.

The particular presently preferred torsional energy absorption devices 22 used with this invention are commercially available. They are constructed so that they can be easily mounted in the indicated manner using a bolt 28. Each of these devices 22 includes a centrally located cylindrical tube 30 which is surrounded by an elastomeric rubber or rubber-like body 32 having a non-round, substantially elliptical external surface 34. This surface 34 is completely encased by a tightly fitting, correspondingly shaped sleeve 36. The particular device 22 illustrated also employs an outwardly extending flange 38 on one end of the body 32 which fits against a correspondingly shaped flange 40 on the sleeve 36.

The length of the device 22 is preferably shorter than the distance between the plates 24 so that a series of washers 42 may be located around the bolts 28 between the device 22 and the plates 24. These washers 42 essentially serve as spacers which can be used to adjust the toe-in of the wheels 12. Such adjustment is achieved by varying the number of washers 42 at one end or the other of the device 22. The member 18 includes a chassis mounting end fitting 44 which includes an eye 46 closely fitting around the exterior of the sleeve 36 so that any rotational movement of the member 18 will be transmitted through the sleeve 36 to the body 32 in order to cause internal stresses and strains within the body 32 which will tend to absorb or take up such torsional energy.

The member 18 also includes a wheel mounting end 48 which is employed for supporting a wheel 12 in a conventional manner. If desired the ends 48 of the members 18 may be offset slightly as illustrated in FIG. 1 of the drawing. Each of the ends 48 is secured to one of the springs 20 intermediate the ends 50 and 52 of such a spring 20 through the use of a conventional U-bolt 54 and a clamping plate 56. It will be noted that the ends 50 of the springs 20 are directly secured to the chassis 14 through the use of conventional supports 58. These ends 50 are located so that the two springs 20 at one side (not separately numbered) of the trailer 16 are positioned so that the other ends 52 of these springs 20 are adjacent to and spaced from one another.

These ends 52 are connected through the use of a link 60 serving essentially as a pivot. These links 60 are pivotally attached to the ends 52 through the use of bolts 62. Corresponding bolts 62 are also used to pivotally mount the links 60 intermediate the ends 52 to brackets 64 secured directly to the chassis 14. With this structure downward movement of the end 52 of one spring 20 will result in upward movement of the end 52 of the adjacent spring 20 connected by a link 60 and vice versa. Preferably the brackets 64 are provided with a series of vertically oriented holes 66 so that the positions of the links 60 may be vertically adjusted as reasonably required in connection with the suspension system 10.

This suspension system 10 may also include a series of conventional shock absorbers 68 connected to the chassis 14 in a conventional manner and also connected to the clamping plates 56 in a conventional manner. Inasmuch as these shock absorbers 68 are used for the usual purpose of impeding rapid movement of the members 18 it is not considered necessary to discuss them in detail in this specification.

As the trailer 16 is towed behind a conventional vehicle (not shown) various surface irregularities of the surface over which the trailer 16 is moved will, of course, result in vertical motion of the individual wheels 12. This will cause limited rotation of the members 18 relative to the bolts 28 and such rotation will result in the application of torsional forces to the devices 22. As such rotation occurs some of the force causing such rotation will be "taken up" by means of the springs 20 and will be transmitted between the springs 20 at the sides of the trailer 16 in such a manner as to cause a degree of coordinated movement between the members 18 connected to the wheels 12 at one side of the trailer 16. However, a significant amount of any such torsional force caused by movement of a particular wheel will be taken up by the device 22 associated with such wheel. Thus, these devices 22 permit vertical movement of the wheels 12 while at the same time they serve to isolate the chassis 14 from such movement.

This action of the devices 22 and, of course, of the springs 20 and of shock absorbers 68 serves to minimize the amount of road shock to which the trailer 16 is subjected as it is moved along an appropriate surface. This is considered to be quite important. A suspension system corresponding to the system 10 is also considered to be quite important because the various parts of the system 10 interact with one another so as to facilitate the trailer 16 being towed behind a vehicle along a straight line even when the trailer 16 is towed over a comparatively irregular or rough road.

Another important feature of the invention lies in the adjustability of the complete system 10. On occasion the manufacturing tolerances employed in constructing a chassis 14 are such as to permit a variation in physical dimensions. Further, as a trailer such as a trailer 16 is used different loads may be carried by the trailer. The particular suspension system 10 is considered quite desirable in that it permits adjustment with a minimum of difficulty to compensate for such manufacturing tolerances and for such load variations.

We claim:

1. In a trailer having a chassis, a plurality of wheels and suspension means for connecting said wheels to said chassis the improvement which comprises:

said suspension means comprising a separate suspension structure for each of said wheels, each of said suspension structures including an elongated rod-like member serving as an axle, a spring, a torsional energy absorption means for use in absorbing torsional energy and a mounting means for use in securing said torsional energy absorption means to said chassis, said member having a chassis mounting end and a wheel mounting end, one of said wheels being rotatably mounted on said wheel mounting end, said spring being connected to said wheel mounting end and to said chassis and serving to resiliently support said wheel mounting end on said chassis, said mounting means being located on said chassis remote from said wheel and said wheel mounting end, said torsional energy absorption means being connected to said chassis mounting end and to said mounting means so as to absorb torsional energy transmitted through said elongated member said energy absorption means being composed of a resilient, elastomeric body.

2. A trailer as claimed in claim 1 wherein:

said mounting means is adjustable so as to permit vertical movement of said torsional energy absorption means and said chassis mounting end relative to said chassis so as to vary the camber of said wheel.

3. A trailer as claimed in claim 1 wherein:

said mounting means is adjustable so as to prevent horizontal movement of said torsional energy absorption means and said chassis mounting end relative to said chassis so as to vary the toe-in of said wheel.

4. A trailer as claimed in claim 1 wherein:

said mounting means is adjustable so as to permit both vertical movement and horizontal movement of said torsional energy absorption means and said chassis mounting end relative to said chassis so as to vary both the camber and the toe-in of said wheel.

5. A trailer as claimed in claim 1 wherein:

said spring is an elongated leaf spring having ends, said wheel mounting end being connected to said spring intermediate said end, and including a separate support means for supporting said spring connecting each end of said spring to said chassis.

6. A trailer as claimed in claim 1 wherein:

each of said support means is adjustable so as to permit separate vertical adjustment of each end of said spring relative to said chassis.

7. In a trailer having a chassis, a plurality of wheels and suspension means for connecting said wheels to said chassis the improvement which comprises:

said suspension means comprising a separate suspension structure for each of said wheels, each of said suspension structures including an elongated member serving as an axle, a spring, a torsional energy absorption means for use in absorbing torsional energy and a mounting means for use in securing said torsional energy absorption means to said chassis, said member having a chassis mounting end and a wheel mounting end, one of said wheels being rotatably mounted on said wheel mounting end, said spring being connected to said wheel mounting end and to said chassis and serving to resiliently support said wheel mounting end on said chassis, said spring being an elongated leaf spring having ends, said wheel mounting end being connected to said spring intermediate said end, and including a separate support means for supporting said spring connecting each end of said spring to said chassis, each of said support means is adjustable so as to permit separate vertical adjustment of each end of said spring relative to said chassis, said mounting means being located on said chassis remote from said wheel and said wheel mounting end, said mounting means being adjustable so as to permit both vertical movement and horizontal movement of said torsional energy absorption means and said chassis mounting end relative to said chassis so as to vary both the camber and the toe-in of said wheel, said torsional energy absorption means being connected to said chassis mounting end and to said mounting means so as to absorb torsional energy transmitted through said elongated member.

8. In a trailer having a chassis, four wheels and a suspension means for connecting each of said wheels to said chassis, two of said wheels being located along one side of said chassis and the other two of said wheels being located along the other side of said chassis, each wheel along one side of said chassis being located in substantially axial alignment with another wheel at the other side of said chassis, the improvement which comprises:

said suspension means comprising a separate suspension structure for each of said wheels, each of said suspension structures including an elongated member serving as an axle, a spring, a torsional energy absorption means for use in a absorbing torsional energy and a mounting means for use in securing said torsional energy absorption means to said chassis, said member of each of said suspension structures having a chassis mounting end and a wheel mounting end, one of said wheels being rotatably mounted on each of said wheel mounting ends, said springs being connected to said wheel mounting ends and to said chassis and serving to resiliently support said wheel mounting ends on said chassis, each of said springs being an elongated leaf spring having ends, said wheel mounting ends being connected to said springs intermediate said ends, said springs at each side of said chassis having said springs, link means connecting the adjacent ends of said springs, a separate support means pivotally connecting each of said link means and each of said link means to said chassis, further separate support means for connecting each of the non-adjacent ends of said springs to said chassis, all of said mounting means being located on said chassis remote from said wheels and said wheel mounting ends, said torsional energy absorption means of each of said suspension structures being connected to said chassis mounting end of said suspension structure and to said mounting means of said suspension structure so as to absorb torsional energy transmitted through said elongated member.

9. A trailer as claimed in claim 8 wherein:

said mounting means are adjustable so as to prevent both vertical and horizontal movement of said torsional energy absorption means and said chassis mounting ends relative to said chassis so as to vary both the camber and the toe-in of said wheels.

10. A trailer as claimed in claim 8 wherein:

said support means connecting said link means are adjustable so as to permit vertical adjustment of the positions of said link means relative to said chassis.

* * * * *